United States Patent
Behbehani

(10) Patent No.: US 6,590,495 B1
(45) Date of Patent: Jul. 8, 2003

(54) AUTOMOBILE DISTANCE WARNING AND ALARM SYSTEM

(76) Inventor: Iraj Behbehani, 19625 Vineyard La., Saratoga, CA (US) 95070

( * ) Notice: Subject to any disclaimer, the term of this patent is extended or adjusted under 35 U.S.C. 154(b) by 0 days.

(21) Appl. No.: 10/015,014

(22) Filed: Dec. 11, 2001

(51) Int. Cl.$^7$ .................................................. B60Q 1/00
(52) U.S. Cl. ........................ 340/435; 340/436; 340/903; 340/904; 701/300; 701/301
(58) Field of Search .................................. 340/435, 436, 340/903, 904; 701/300, 301

(56) References Cited

U.S. PATENT DOCUMENTS

| | | | |
|---|---|---|---|
| 3,841,427 A | 10/1974 | Di Vita | 180/98 |
| 5,357,438 A * | 10/1994 | Davidian | 701/301 |
| 5,388,048 A * | 2/1995 | Yavnayi et al. | 701/301 |
| 5,410,304 A | 4/1995 | Hahn et al. | 340/903 |
| 5,529,138 A * | 6/1996 | Shaw et al. | 180/169 |
| 5,684,473 A * | 11/1997 | Hibino et al. | 340/903 |
| 5,889,476 A | 3/1999 | Schmitz | 340/903 |
| 6,014,601 A | 1/2000 | Gustafson | 701/45 |
| 6,278,360 B1 | 8/2001 | Yanagi | 340/436 |
| 6,388,580 B1 * | 5/2002 | Graham | 340/903 |

* cited by examiner

*Primary Examiner*—Daniel J. Wu
*Assistant Examiner*—Lam Pham
(74) *Attorney, Agent, or Firm*—Thomas Schneck

(57) ABSTRACT

An automobile distance warning and alarm system (ADWAS) in which the warning system is armed when the vehicle exceeds a threshold speed. The vehicle speed is used, along with road or weather conditions, to determine a safe vehicle separation time and corresponding distance. A range finder then determines the actual separation distance between the driver's vehicle and a forward or following vehicle. If the safe separation distance is not maintained for a selected dead time interval, the driver is alerted by an alarm, which may be both an audible and visual alarm. The driver of a following vehicle is also alerted by a rear indicator light.

25 Claims, 3 Drawing Sheets

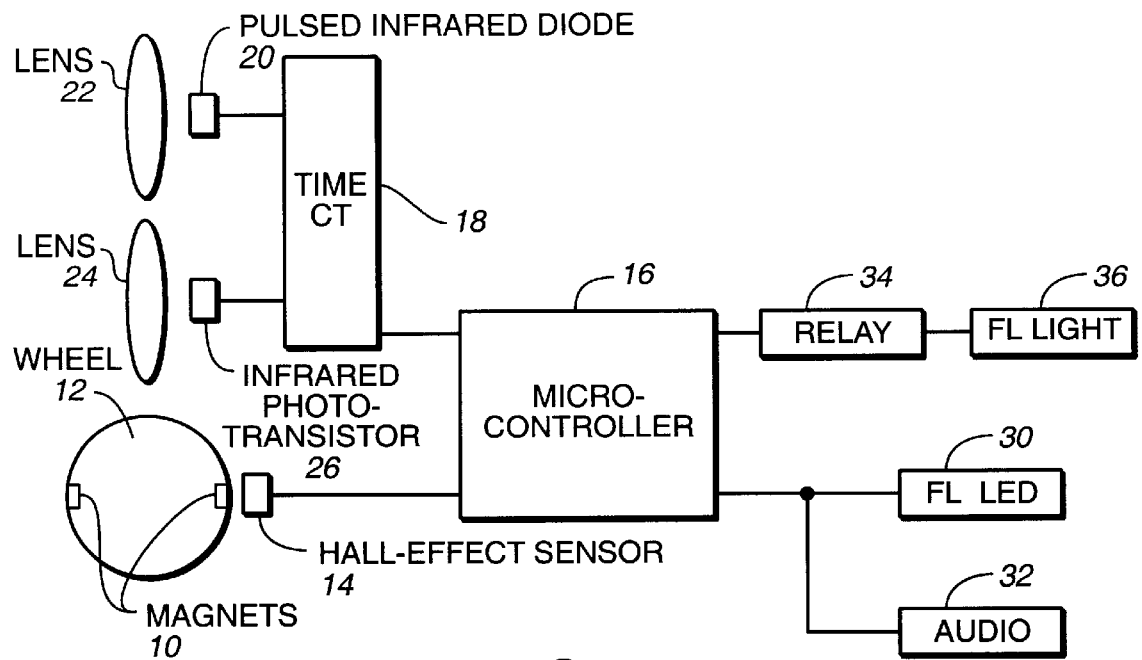
FIG._1
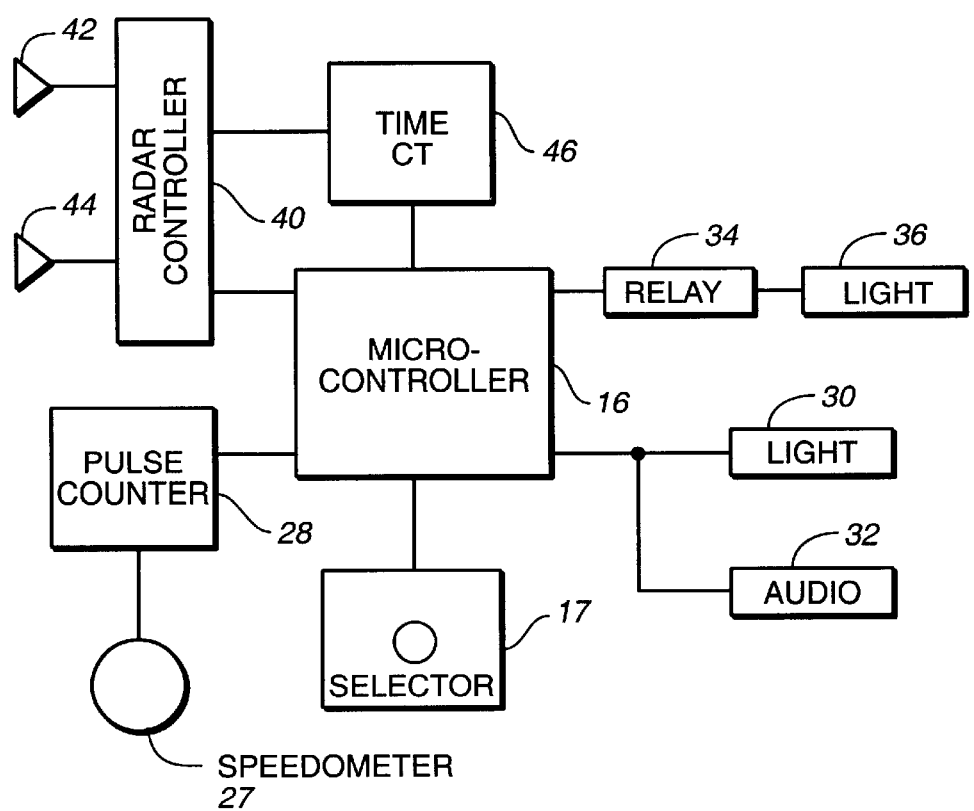
FIG._2

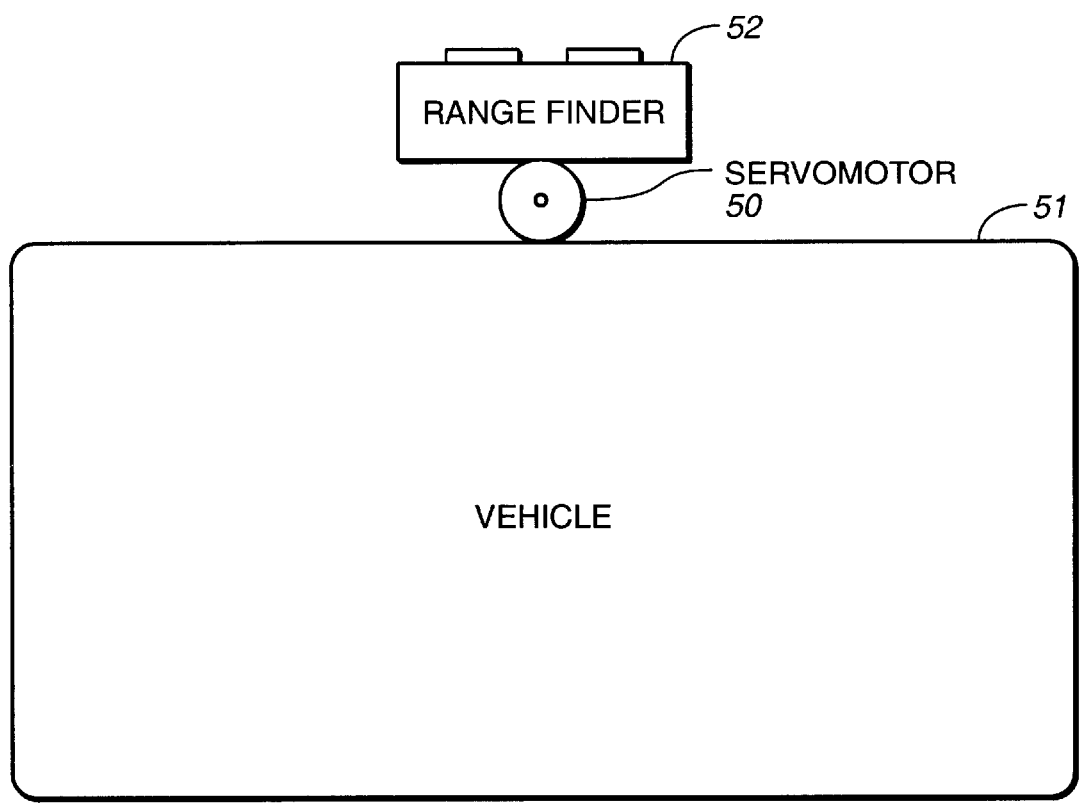
FIG._3

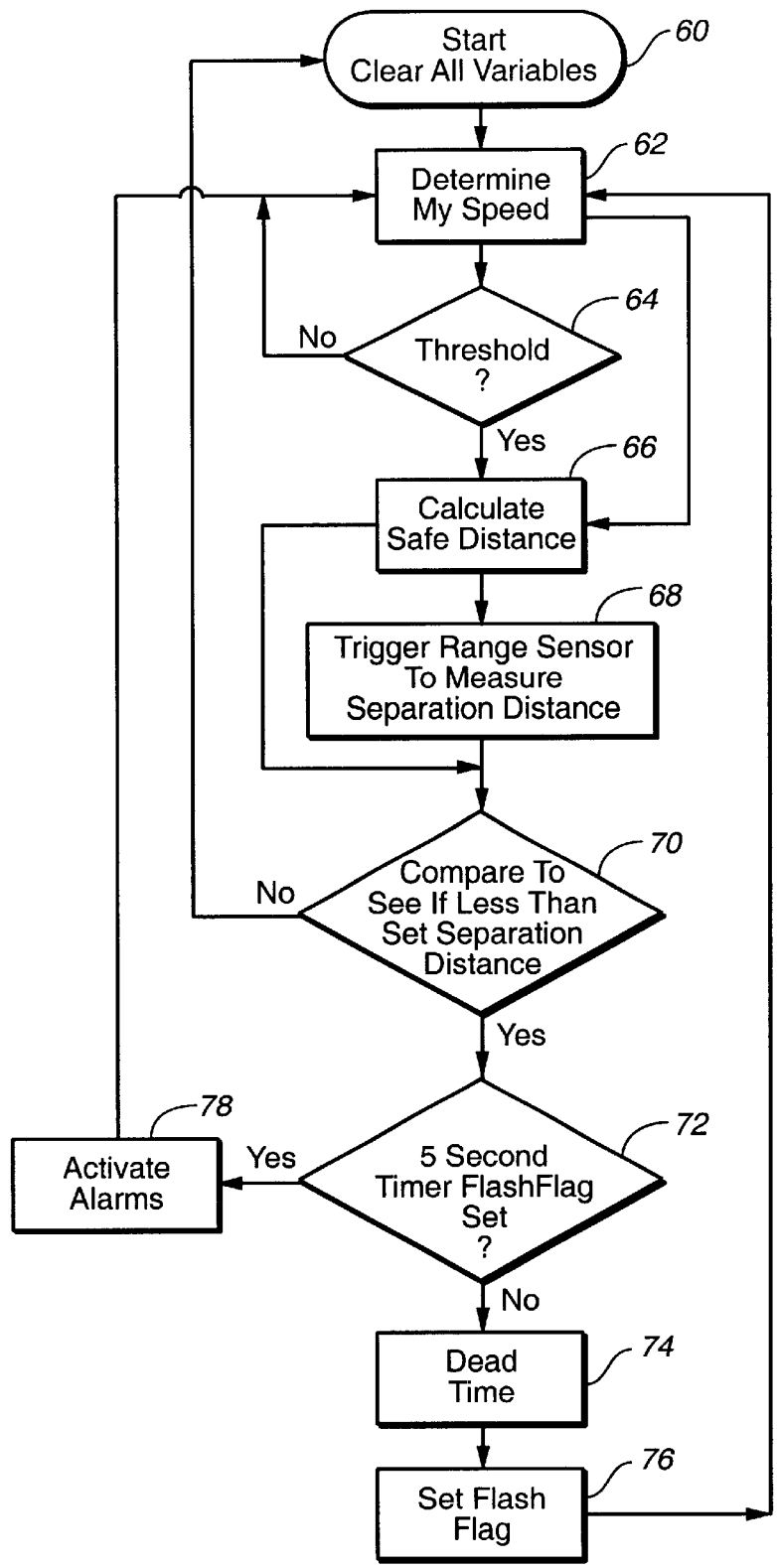
FIG._4

AUTOMOBILE DISTANCE WARNING AND ALARM SYSTEM

TECHNICAL FIELD

The present invention relates to a system for improving automotive safety and specifically for a system for warning a driver when a safe distance is not maintained between vehicles.

BACKGROUND OF THE INVENTION

Many automobile rear collisions are caused by a failure to maintain a safe distance between moving vehicles. To reduce the risk of these collisions a minimum separation distance should be kept between moving vehicles. A minimum separation standard recommended by the California Department of Motor Vehicles and others is a separation of the distance the vehicle travels in three seconds. This separation allows sufficient time for perception of a hazard, decision and reaction time, and mechanical braking distance. Unfortunately, many drivers either ignore this rule or are unaware of this rule. In addition, inexperienced drivers may lack the perception needed to calculate a safe separation distance. A system is needed in which a driver is automatically informed when a safe distance is not maintained between vehicles.

A number of different devices have been developed to monitor vehicle separation and enhance vehicle safety. U.S. Pat. No. 5,889,476 to Schmitz describes a device in which a collision avoidance system continuously measures a vehicle speed and a separation distance between a forward vehicle. When a minimum safe distance is not maintained between the vehicles the system automatically applies the brakes of the vehicle by switching over at least one of the engine cylinders to a compressor operation. A similar device is described in U.S. Pat. No. 3,841,427 to Di Vita. In this device a radar unit is used to determine the distance between a forward vehicle and a driver's vehicle. A tachometer measures the speed of driver's vehicle. A safe separation distance is calculated from the speed of the driver's vehicle. If this separation distance is not maintained between the driver's vehicle and the forward vehicle brakes are automatically applied.

A number of different devices have been developed which do not automatically stop the vehicle but instead simply inform the driver when a safe separation distance is not maintained. U.S. Pat. No. 5,410,304 to Hahn et al. shows a system using a radar sensor for detection of vehicle separation. The driver speed, along with weather and road conditions from sensors, is used to calculate a safe separation distance. Flashing lights warn the driver when a safe separation distance is not maintained. A similar system is shown in U.S. Pat. No. 6,014,601 to Gustafson. In this device a laser is used to determine the separation between an automobile and an object. A speedometer measures the vehicle speed from which a safe separation distance is calculated. The laser rangefinder also calculates the relative speed of the object and relative acceleration of the object with respect to the drivers vehicle. The safe separation distance is calculated from this information and road condition information. A collision time display as well as a safety danger display is provided for the vehicle's driver. U.S. Pat. No. 6,278,360 B1 to Yanagi discloses an alternative vehicle collision warning system. In this system the speed of a drivers vehicle and a preceding or following vehicle is measured, as by transmission of signals from each of the vehicles. This device may either alert the driver or automatically apply a breaking device if the safe separation distance is not maintained.

The systems of the prior art contain a number of drawbacks. First, systems that track every event in which a safe separation distance is not maintained may prove less useful than a more selective system. At slow speeds, the danger of a collision is lower and the damage from such collision is less severe. However, if the alarm system continuously notifies the driver of every instance in which an optimal separation is not maintained there is the risk that the system would be simply ignored. In addition, there are short periods when vehicles may come into close proximity. For instance, during lane changes cars may be closer than the optimum separation distance. However, if the alarm system provides a warning at this time, the driver may become complacent or annoyed, making the alarm less useful.

In addition, the prior systems have not been able to track cars on curved roads. In separation systems that target a car in the same lane, the onboard tracking system that records the separation distance often points directly in front of or behind a vehicle. On curves, such a front pointing device could be pointing into another lane or off the road. This is problem occurs on curves, which can be the most dangerous part of a road.

It is an object of the present invention to provide an onboard automobile distance warning and alarm system that can aid a driver in maintaining a safe separation distance between vehicles. It is a further object that such a system note separation distances for vehicles in front of and vehicles behind the driver's vehicle. It is also an object that such a system provide a warning to following vehicles that a safe separation distance is not being maintained. Such a system should be able to calculate the safe separation distance under both normal driving conditions and more hazardous driving conditions (e.g. night driving, rain, etc.).

It is an additional object to provide a system that avoids giving a warning in less dangerous conditions, such as at slower speeds or when the failure to maintain an optimal separation distance is only temporary. It is a further object to provide a system that is able to measure, using an onboard range detector, the distance of separation even when the road curves.

SUMMARY OF THE INVENTION

The above objects have been achieved with an automobile distance warning and alarm system (ADWAS). Such a system includes two rangefinders mounted on the front and rear of the driver's vehicle respectively. The system becomes armed when the driver exceeds a selected threshold speed. The driver's speed is used to calculate a safe separation distance, which is then compared to the distance between the driver's vehicle and vehicles in front of or behind the driver's vehicle (i.e. the driver's vehicle and a proximate vehicle in the same lane). As mentioned above, a safe separation is often expressed in terms of seconds. Since distance separation equals speed times time, a separation time of three seconds at 60 mph (~90 fps) translates to a separation of 270 feet (3×90). In one embodiment, information about the weather or road conditions is input into the system to be factored into calculation of the safe separation distance. If the measured separation distance is less then a calculated safe distance, an audio and/or visual alarm alerts the driver.

In one embodiment, each rangefinder is mounted on a swivel mount that is controlled by the steering wheel. When the car turns, the rangefinder turn with the wheels, allowing continued distance calculations of cars in front of or behind the driver's vehicle.

BRIEF DESCRIPTION OF THE DRAWINGS

FIG. 1 is a plan of the automobile distance warning and alarm system of the present invention.

FIG. 2 is an alternate plan view of the automobile distance warning and alarm system of FIG. 1.

FIG. 3 is a plan view of a rangefinder for the system of FIG. 1.

FIG. 4 is a flow chart showing the operation of the present invention.

DETAILED DESCRIPTION OF THE INVENTION

The instant system has four primary components: a driver's vehicle speed sensor, a microcontroller, a rangefinder and alerting devices. The speed sensor detects vehicle speed and transmits this speed to a microcontroller. If the speed exceeds a selected threshold, the rest of the system is engaged. Once the system is engaged, the rangefinder sends out signals to detect the presence of forward or following vehicles. The rangefinder is any known type of device, such as the pulse-echo type like radar or a sonic equivalent. The rangefinder may be mounted on the front of the car to detect forward vehicles or on the rear of the car to detect following vehicle. It is preferred that a forward and following vehicles be employed. If a separate rangefinder for forward or following vehicles are present, the separation of the forward or following vehicle and the driver's vehicle are compared to a safe separation distance based on the driver's speed.

Following a selected time interval, the separation distance is again measured and compared to a safe separation distance based on the driver's speed. If the forward or following vehicle is closer than the safe separation distance for the time interval, the alerting devices are activated. The alerting devices may be an audio or visual signal to the driver, or both. This alerts the driver of a need to increase the separation distance between vehicles. In addition, a visual signal may be given to following cars that a safe separation distance is not maintained.

With reference to FIG. 1, a Hall-effect sensor 14 is mounted proximate to the wheel 12 (or the drive shaft). Magnets 10 on the wheel pass near Hall-effect sensor 14 as the wheel 12 rotates. The magnetic fields are detected when the magnet 10 passes the Hall-effect sensor 14. Each detection of the magnetic field is transmitted as a pulse to a microcontroller 16. The microcontroller is a small computing device that counts the pulses, which are directly related to the speed of the vehicle. For example, with a standard tire, 8 pulses per second corresponds to 46 feet per second or 31.4 miles per hour. When the microcontroller detects that the speed of the vehicle has exceeded a threshold speed, the rest of the system is activated. Thirty miles per is one contemplated threshold speed. A vehicle speed signal may also be obtained from the vehicle speedometer and is preferable because of simplicity.

Once the microcontroller has detected that the vehicle is exceeding the threshold speed, say 30 mph, the system is armed. In this example, the rangefinder is a laser pulse-echo sensor. A time measuring circuit 18 instructs a pulsed infrared diode 20 to send out pulses. A lens 22 focuses the laser to a distance enabling the range of the detector to be sufficient to operate at the distances required to detect vehicles at the edges of a safe vehicle separation zone when a vehicle is traveling at 60 miles per hour, namely 270 feet per the example given above. Pulsed diode 20 sends out a laser pulse every second. If a vehicle is within the range of the laser pulse a return pulse is focused by lens 24 and detected by infrared phototransistor 26. The laser beam must reflect or scatter from a forward or following vehicle for the separation distance to be accurately measured. The output of the laser rangefinder is proportional to the separation distance. Time measuring circuit 18 calculates the separation distance and relays this information to microcontroller 16. A radar pulse-echo rangefinder may be used, as described below, and has been found to be preferable because the radar return signal is easier to detect.

The separation distance between the vehicles measured by the rangefinder is compared by the microcontroller 16 to a safe separation distance based on the vehicle speed. If a safe separation distance is not maintained the microcontroller 16 signals the time measuring circuit 18 to repeat the signal after a selected interval. For example, a five second interval would allow the system to confirm that a safe following distance is not being maintained and the proximity of the vehicles is not the result of a transient event, such as a lane change. If microcontroller 16 determines that a safe separation distance has not been maintained for the selected time period, a signal is sent to the alarm systems.

If the signal sent by microcontroller 16 indicates that a following vehicle is not maintaining a safe separation distance a signal is sent to relay 34 which transmits a signal to light 36. Light 36, which is positioned on the rear of the driver's vehicle, is then lit or begins flashing. This is intended to indicate to a following driver that a safe separation distance is not being maintained. A flashing amber light may be preferred for maximum ability to penetrate fog. The light may be located on the rear of the driver's vehicle in the line of sight of the operator of the following vehicle. For example, the rear indicator could be mounted near the brake lights. A preferable location for this light is atop the third brake light.

If microcontroller 16 determines that either a forward or following vehicle is closer than the selected safe separation distance for a selected time interval, microcontroller 16 activates the driver alarms. Controller 16 activates light 30 (e.g. a flashing LED) and may also activate audio alarm 32. This would signal to the driver that a greater vehicle separation is required. For a forward vehicle, a preferable location for a warning light is on the dashboard, atop of the speedometer. A buzzer may be similarly located. For a following vehicle, a preferable location for a warning light for the driver is atop the rear view mirror. A buzzer may be similarly located.

With reference to FIG. 2, a speedometer 27 sends signals to a pulse counter 28, that relays the pulse count to a microcontroller 16, which converts the pulse count to a vehicle speed. If the speed of the vehicle exceeds a threshold speed, microcontroller 16 arms the rangefinder system. In this instance, microcontroller activates pulse and timing circuit 46, which activates radar controller 40. Radar controller 40 activates radar horn antenna transmitter 42 to send out a 10.7 Ghz pulse train. This pulse train is reflected off of vehicles in front of transmitter 42. Radar horn antenna receiver antenna 44 detects the reflected pulse and transmits the electronic signal of detection to radar controller 40. This signal is transmitted to pulse and timing circuit 46, which calculates the separation distance. The vehicle separation distance is then transmitted to microcontroller 16. The use of radar allows monitoring of vehicle separation in rain or fog with very little signal degradation.

Controller 16 receives input information from selector 17 indicating road or weather conditions. In one embodiment, this selector could be a dashboard switch in which the driver could indicate night driving, fog, rain, ice or other driving conditions. In another embodiment, selector 17 could be incorporated into controls for the headlights or windshield wipers. Activation of these controls would automatically provide an indication of altered driving conditions without requiring the driver to activate a separate switch. The signal from selector 17 would be used by microcontroller 16, along with the signal from pulse counter 28 to calculate a safe vehicle separation distance. This distance would then be compared to the actual separation distance from timing circuit 46. As in the previous example, the separation distance is measured multiple times, and only if there is a failure to maintain a safe separation distance for a selected time interval will the alarm system be activated. As in the previous example, a relay 34 and light 36 are used to provide an indication to a following driver. An indicator light 30 and audio alarm 32 are used to indicate to the driver that a safe separation distance is not being maintained. Locations for the warning devices are the same as previously described.

On a winding road there may be some difficulty in keeping the rangefinder targeted on the car in the same lane. On a curve, the front of a drivers car may be facing another lane or even off the road. This would cause the rangefinder to temporarily lose the signal from a vehicle that was being monitored. Such temporary loss of vehicle monitoring could be problematic, given that the system only provides an alarm if the failure to maintain a safe separation distance is maintained over a set time period. To mitigate this problem a tracking for the system has been developed. With reference to FIG. 3, a rangefinder enclosure 52, housing a radar or pulse laser rangefinding system, is linked to a servomotor 50 controlled by the steering wheel. When the steering wheel of vehicle 51 is turned, servomotor 50 alters the angle of rangefinder 52 to keep the rangefinder pointed in the same driving lane.

In the flow chart of FIG. 4, an algorithm controlling the operation of present system is shown. At the start of the process all variables are cleared in block 60. The first step requires determination of vehicle speed, as by a signal from the vehicle speedometer or a Hall-effect sensor in block 62. Next, it is determined whether the speed is greater than a threshold speed (i.e. 30 miles per hour) for arming the system in block 64. If the speed is not greater than the threshold speed then the warning system is not armed and the speed is again measured in block 62. If the speed is greater than the threshold speed, then the safe separation distance for the vehicle speed is calculated in block 66. This safe separation distance includes the distance required for stopping a vehicle, considering traveling distance during a reaction time, a decision time and a mechanical stopping time. The distance traveled in these combined times is the total stopping distance and is the preferred safe separation interval. Input from the driver about weather or road conditions may be selected to determine the safe separation distance, with increasing separation distance required for more hazardous driving conditions. A rangefinder then determines the separation distance between the driver's vehicle and forward or following vehicle in block 68. This separation distance is determined by the radar, laser pulse or other rangefinder, as previously described. The measured separation distance is then compared to the safe separation distance in block 70. If the vehicle separation is greater than the safe separation distance, the process is restarted by clearing all variables in block 60. If the vehicle separation distance is less than the safe separation distance, the system determines if the failure to maintain the safe separation distance has been occurring for a selected dead time interval, such as five seconds in block 72. The dead time allows for short lapses in separation which occur in lane changes. If the safe separation distance has persisted beyond the selected dead time interval, the alarm then is activated in block 78. This alarm may be an audio or visual alarm alerting the vehicle driver. Additionally, an exterior light, such as a strobe light, may alert the driver of a following car that a safe separation distance is not being maintained. If the system has not detected a failure to maintain a safe following distance of the selected time interval, then an interval timer is set in block 74. In other words, block 74 establishes a dead time so that lane changes will not set off a false alarm. Following the interval, an interval indicator is activated in block 76. The vehicle speed is then again determined in block 62 and the subsequent steps repeated. If the unsafe following distance persists for the period of the time interval, the alarm is then activated in block 78.

What is claimed is:

1. A method of warning a driver about unsafe separation distances between a driver's vehicle and at least one proximate vehicle, comprising:

a) measuring the separation distance of a proximate vehicle;

b) selecting a safe separation time between the driver's vehicle and the proximate vehicle;

c) measuring the speed of the driver's vehicle and arming an alarm system if the speed exceeds a threshold speed;

d) converting the safe separation time to a safe separation distance based upon the measured speed of the driver's vehicle;

e) comparing whether the measured separation distance is under the safe separation distance;

f) operating the alarm system when the measured separation distance is under the safe separation distance if the alarm system has been armed; and g) providing a preset dead time for the alarm system during which no alarm can be activated.

2. The method of claim 1 wherein the proximate vehicle is a vehicle forward of the driver's vehicle.

3. The method of claim 2 wherein the step of operating the alarm system is by providing a second light in the driver's vehicle visible to the driver.

4. The method of claim 2 wherein the step of operating the alarm system is by providing an audible alarm in the driver's vehicle.

5. The method of claim 1 wherein the proximate vehicle is vehicle rearward of the driver's vehicle.

6. The method of claim 5 wherein the step of operating the alarm system is by providing a strobe light directed to the rearward vehicle and by providing a first light visible to the driver.

7. The method of claim 5 wherein the step of operating the alarm system is by providing an audible alarm in the driver's vehicle.

8. The method of claim 1 wherein the proximate vehicle is both a vehicle rearward of the driver's vehicle and a vehicle forward of the driver's vehicle.

9. The method of claim 1 where the step of measuring the separation distance of a proximate vehicle is by providing pulse ranging.

10. The method of claim 9 further defined by providing a servo system for pulse ranging which turns pulse ranging in accordance with turning of the driver's vehicle.

11. The method of claim 1 wherein the step of measuring the speed of the driver's vehicle is by providing a Hall effect sensor.

12. The method of claim 1 wherein the step of measuring the speed of the driver's vehicle is by reading a vehicle speedometer.

13. A method for warning a driver about unsafe separation distances between a driver's vehicle and at least one proximate vehicle, comprising:

a) engaging a warning system onboard a driver's vehicle when a driver's vehicle exceeds a preset speed;

b) determining a vehicle speed of driver's vehicle;

c) determining a relative separation distance of a proximate moving vehicle using a rangefinder onboard driver's vehicle;

d) calculating a safe separation distance between said driver's vehicle and said proximate vehicle based on driver's vehicle speed;

e) issuing a warning signal if the safe separation distance is not maintained for a period exceeding a preset dead time period.

14. The method of claim 13, wherein the proximate vehicle is one of a forward and a following vehicle.

15. The method of claim 13, wherein steps c-e are repeated for both a forward vehicle and a following vehicle.

16. The method of claim 15, further including:

providing a visual signal to the following vehicle if a safe separation distance is not maintained between the driver's vehicle and the following vehicle.

17. The method of claim 13, wherein said warning signal is a flashing light visible to the driver.

18. The method of claim 13 wherein the proximate vehicle is a following vehicle and the warning signal comprises a flashing light.

19. The method of claim 18 wherein the warning signal further comprises an audible signal.

20. The method of claim 13 wherein the warning signal comprises an audible signal to the driver.

21. The method of claim 13, wherein step d includes:

inputting road and weather conditions rotating into said safe separation distance.

22. The method of claim 21, wherein inputting of road and weather conditions is by selecting a safe separation time and converting the safe separation time to a safe separation distance.

23. The method of claim 10, wherein the preset speed of step a) is 30 miles per hour.

24. The method of claim 13, wherein the preset dead time period of step e) is five seconds.

25. The method of claim 13, further defined for a turning vehicle by servoing the rangefinder to track the direction of turning of the turning vehicle.

* * * * *